United States Patent [19]

Braun

[11] Patent Number: 5,830,524
[45] Date of Patent: Nov. 3, 1998

[54] HEATABLE NEEDLE SEAL NOZZLE ASSEMBLY

[75] Inventor: Peter Braun, Hungen, Germany

[73] Assignee: Ewikon Heisskanalsysteme GmbH & Co. KG, Kirchlengern, Germany

[21] Appl. No.: 768,509

[22] Filed: Dec. 18, 1996

[30] Foreign Application Priority Data

Dec. 23, 1995 [DE] Germany .................. 195 48 687.0

[51] Int. Cl.⁶ .................................................. B29C 45/20
[52] U.S. Cl. ................ 425/549; 264/328.9; 264/328.15; 425/562; 425/564; 425/566
[58] Field of Search ..................... 425/562, 563, 425/564, 565, 566, 549; 264/328.9, 328.15

[56] References Cited

U.S. PATENT DOCUMENTS 4,836,766  6/1989  Gellert ..................................... 425/563
5,004,416  4/1991  Van Den Brink ....................... 425/564

*Primary Examiner*—Tim Heitbrink
*Attorney, Agent, or Firm*—Henry M. Feiereisen

[57] ABSTRACT

A needle seal nozzle assembly for a plastics injection machine, injection mold or hot-runner system, includes a housing defining a passageway for feeding a melt from an inlet to an outlet, with housing being formed by a first housing portion having one end facing the inlet, and by a second housing portion facing the other end of the first housing portion and having an interior forming part of the passageway. The first housing portion includes a substantially cylindrical tubular body which defines a fluid channel that forms another part of the passageway and is fluidly connected to the interior of the second housing portion. Received in fluidtight manner between the first and second housing portions is a slide for displacement between a first position in which a fluid flow through the outlet is cut and a second position in which the flow of melt is open through the outlet. The slide has one end formed with a sealing needle for regulating the fluid flow through the outlet and another nozzle-distant end which is acted upon by a drive mechanism for moving the slide between the first and second positions.

16 Claims, 5 Drawing Sheets

FIG. 2
FIG. 3
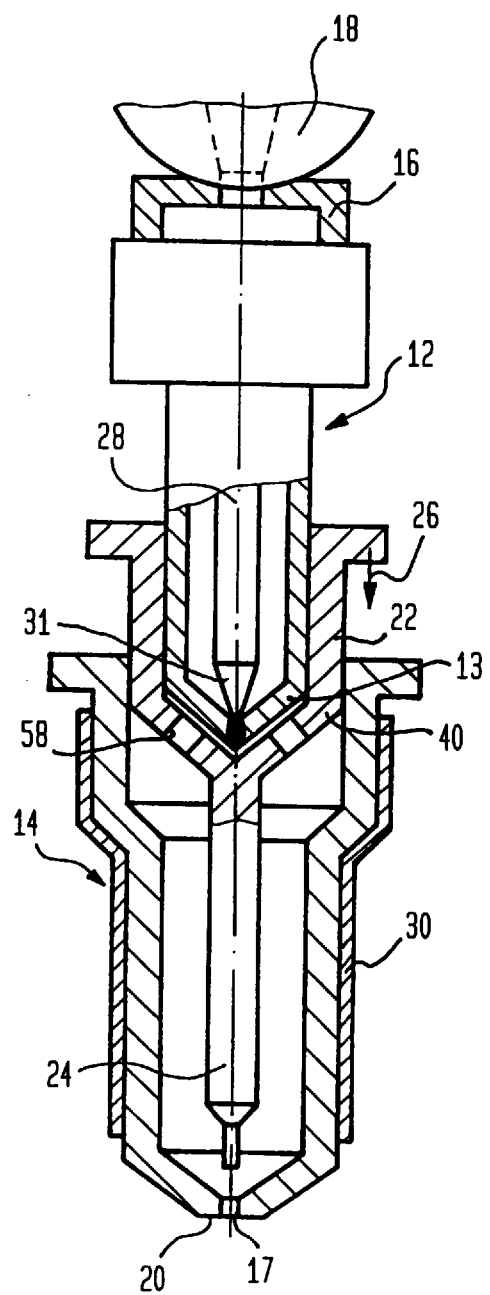
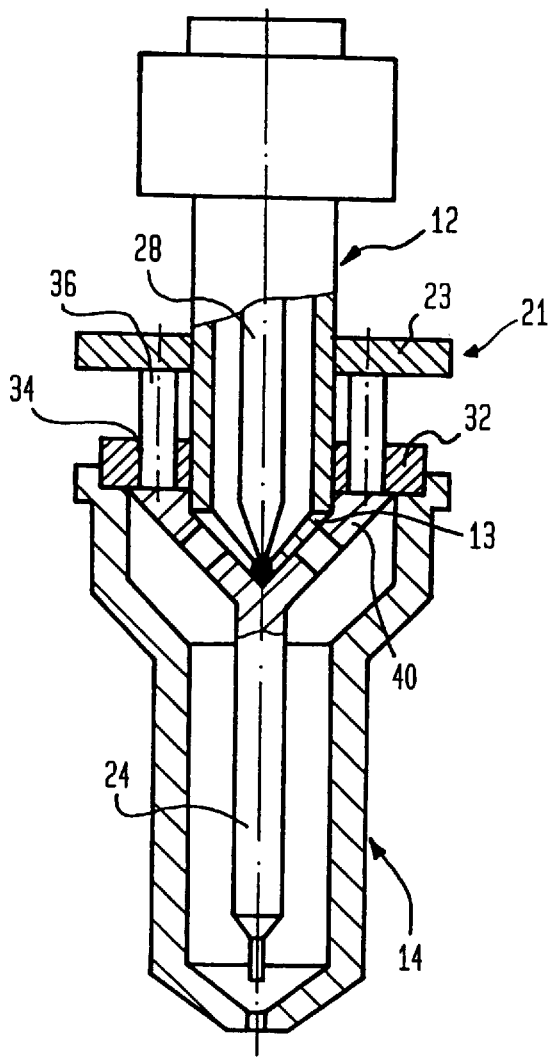

HEATABLE NEEDLE SEAL NOZZLE ASSEMBLY

BACKGROUND OF THE INVENTION

The present invention refers to a heatable needle seal nozzle assembly for a plastics injection machine, injection mold or hot-runner tool.

In general, a needle seal nozzle assembly includes a sealing needle which is movable between a retracted open position and a forward closed position to regulate a flow of fluid, such as melt, through a gate, with the displacement of the sealing needle being effected by a mechanical, pneumatic or hydraulic drive. Such nozzle assemblies which are formed with an inlet for connection to an injection molding machine and an outlet for connection to the mold cavity encounter problems when applying the required force onto the sealing needle to effect the actual displacement between the open and closed positions. As there is no possibility to connect the sealing needle with respective drives at the melt inlet end or at the melt outlet end, the drive forces are typically applied in conventional needle seal nozzles in a central area. This however makes it necessary to divert the fluid passageway around the central area, as e.g. disclosed in U.S. Pat. No. 5,387,099 or European Pat. No. EP 0,373,293.

The provision of such diversions is however disadvantageous because the prevailing significant injection pressure within the fluid passageway frequently leads to sealing problems and uncontrolled forces which emanate from the melt flow and act laterally upon the sealing needle so that the sealing needle is subject to a one-sided load. This results in significant wear in the area of the needle guide within the nozzle body as well as in the area of the nozzle seat, i.e. in the area of the forward needle end and the corresponding nozzle orifice. Moreover, these types of needle seal nozzles exhibit a relatively complicated and bulky structure that limits its field of application, and require increased energy supply for effecting an even heating action. The required diversion of the fluid passageway also results in a higher pressure loss. As a result of all these drawbacks, operation of this conventional nozzle assembly becomes less cost-efficient and the quality of the injection-molded articles is impaired.

SUMMARY OF THE INVENTION

It is an object of the present invention to provide an improved needle seal nozzle assembly, obviating the afore-stated drawbacks.

In particular, it is an object of the present invention to provide an improved needle seal nozzle assembly which prevents the flowing melt from applying a one-sided load upon the sealing needle while yet allowing a compact structure of the overall nozzle assembly.

These objects and others which will become apparent hereinafter are attained in accordance with the present invention by providing a housing which defines a passage-way for feeding a flowable material from an inlet to an outlet, and is formed by a first housing portion having one end facing the inlet, and a second housing portion facing the first housing portion and having an interior forming part of the passageway, with the first housing portion including a substantially cylindrical tubular body which defines a fluid channel forming another part of the passageway and fluidly connected to the interior of the second housing portion, and by arranging a slide in fluidtight manner between the first and second housing portions for displacement between a first position in which the outlet is closed and a second position in which the outlet is open, with the slide having one end formed with a nozzle for regulating the fluid flow through the outlet and another nozzle-distant end acted upon by a drive mechanism for moving the slide between the first and second positions.

According to another feature of the present invention, the first housing portion includes a heating element which is so received centrally in the fluid channel as to shape the fluid channel in the form of a circular ring, while the second housing portion is enclosed by an external heating element.

The split of the housing in two housing portions, with one housing portion accommodating an internal heating element and being devoid of the sealing needle, and with the other housing portion accommodating the sealing needle for regulating the outlet and enclosed by an external heating element allows a superior heating action without experiencing application of a one-sided load and eliminating a need for diverting the fluid passageway through the nozzle assembly, while yet permitting a compact structure.

Suitably, the internal heating element is so positioned as to extend into the sphere of influence of the external heating element.

BRIEF DESCRIPTION OF THE DRAWING

The above and other objects, features and advantages of the present invention will now be described in more detail with reference to the accompanying drawing in which:

FIG. 1b is a partly sectional view of a slide for installation in the housing of the needle seal nozzle assembly of FIG. 1a;

FIG. 2 is a partly sectional view of the needle seal nozzle in an assembled state, with the sealing needle in retracted open position and with slightly modified housing portion;

FIG. 3 is a partly sectional view of another embodiment of a needle seal nozzle assembly according to the present invention;

DETAILED DESCRIPTION OF PREFERRED EMBODIMENTS

Figure 1A:
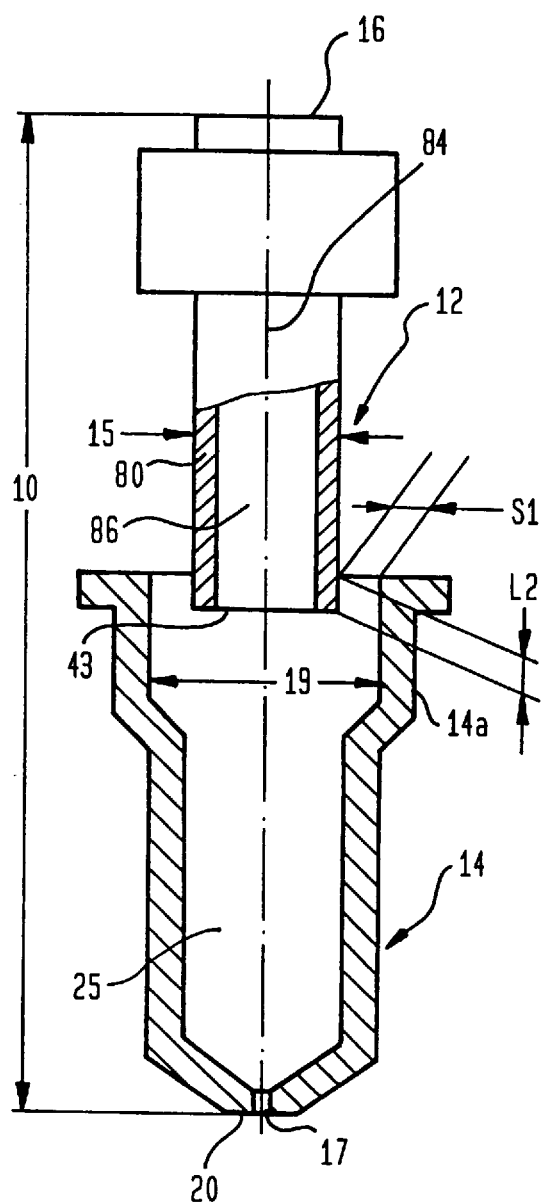
FIG. 1a is a partly sectional view of a housing of one embodiment of a needle seal nozzle assembly according to the present invention, for illustration of the melt flow passage.

Throughout all the Figures, the same or corresponding elements are generally indicated by the same reference numerals.

Turning now to the drawing, and in particular to FIG. 1a, there is shown a partly sectional view of a housing or nozzle manifold 10 of one embodiment of a needle seal nozzle assembly according to the present invention. The housing 10 defines a longitudinal axis 84 and includes two housing portions, generally designated by reference numerals 12 and 14, with the housing portion 12 defining an outer diameter 15 and formed with an inlet end 16 for connection to an injection cylinder, indicated by reference numeral 18 (FIG. 2), or to a not shown hot runner mold. The housing portion 12 is formed of a substantially cylindrical tubular body 80 that defines a passageway 86 for a flowable material, e.g. melt, that enters through inlet 16. The housing portion 14 defines an interior space 25 and is formed with a rearward section 14a which has an inner diameter so that a forward extremity 43 of the housing portion 12 dips into the housing portion 14 by a value L2 at formation of a gap S1. The forward end 20 of the housing portion 14 is formed with an orifice or gate 17 for conduction of melt to the cavity of the injection mold.

Figure 1B:
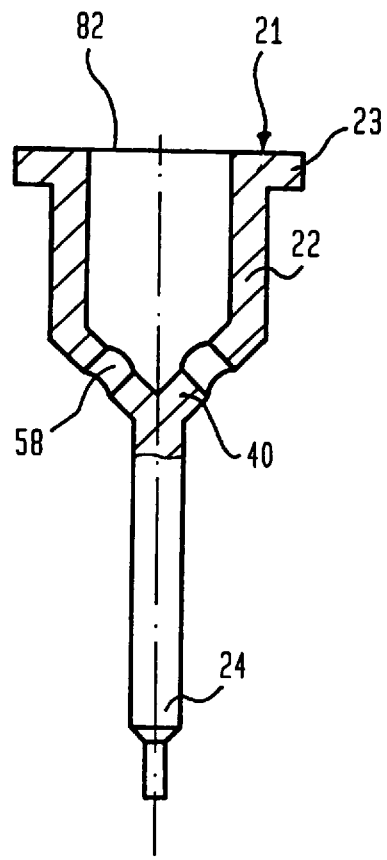

FIG. 1b is a partly sectional view of a slide unit, generally designated by reference numeral 21 for installation in the housing 10. The slide unit 21 includes a sleeve 22 with conical bottom 40 to terminate in a central sealing needle 24. As shown in FIG. 2, the slide unit 21 is received in the gap S1 between the housing portions 12, 14 and guided in fluidtight manner along the outside wall surface of the housing portion 12 and the inside wall surface of the rearward section 14a of the housing portion 14 for displacement in axial direction, as indicated by arrow 26. At its bottom-distal end 82, the sleeve 22 is formed integrally with a flange 23 which assumes the function of a piston of a drive mechanism by which the slide unit 21 is moved in axial direction. The bottom 40 of the sleeve 22 has incorporated therein feed channels 58 which are in fluid communication with the passageway 86 of the housing portion 12. In the event the forward section 13 of the housing portion 12 is of conical configuration to complement the contour of the bottom 40 of the sleeve 22, as shown in FIG. 2, suitable bores (not shown) are formed in the forward section 13 of the housing portion for fluid connection with the feed channels 58.

In the assembled state of the needle seal nozzle assembly as shown in FIG. 2, the melt passage as defined by the passageway 86 and the interior space 25 of the housing portion 14 extend essentially over the entire axial length of the housing 10 in symmetry to the common axis 84 of the housing portions 12, 14 and of the slide unit 21.

Figure 4:
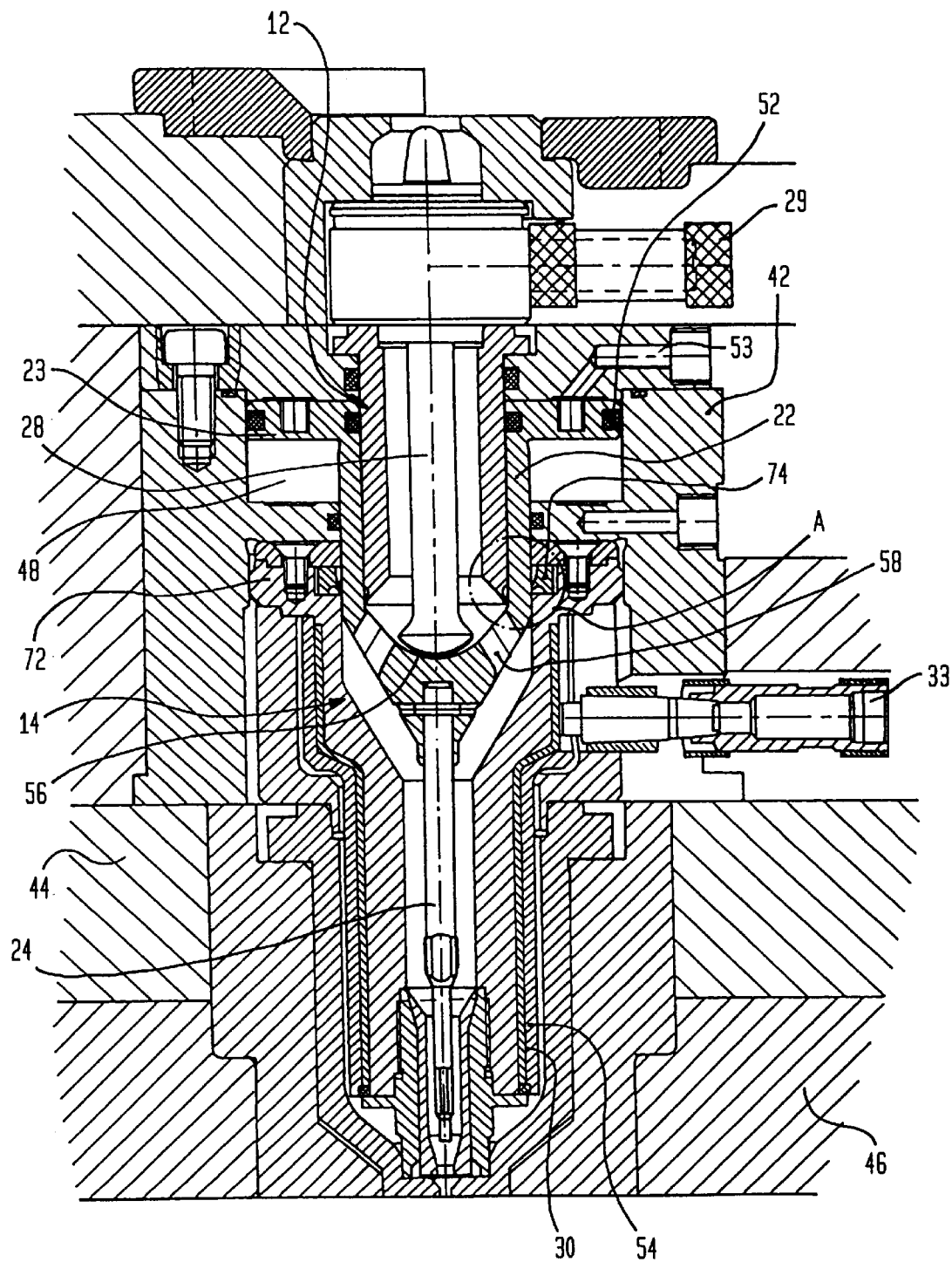
FIG. 4 is a fragmentary, sectional view of an injection molding system, incorporating a needle seal nozzle assembly according to the present invention, showing the sealing needle in retracted open position to allow a fluid flow through the nozzle gate.

As further shown in FIG. 2, the housing portion 12 accommodates an internal electric heating element 28 which is set centrally in the passageway 86 so that the passageway 86 is shaped of circular ring type configuration. The heating element 28 is based on electric resistance heating in which heat is generated by current that is fed to the upper part of the heating element 28 via a plug-connection 29 (FIG. 4). The heating element 28 has a high electric resistance and exhibits a tip 31 which is welded to webs of the forward section 13 of the housing portion 12. The housing portion 14 is enclosed by an external electric heating element 30 which is also based on electric resistance heating, with current being supplied via a plug-connection 33 (FIG. 4). The heating element 30 is so dimensioned as to extend into the sphere of influence of the internal heating element 28.

The provision of the internal central heating element 28 within the housing portion 12 and the external heating element 30 circumscribing the housing portion 14 permits the formation of suitable cylindrical surfaces for slidably receiving the sleeve 22 in a fluidtight fashion.

It will be understood by persons skilled in the art, that the heating elements may be of any suitable type and thus have not been shown in detail for sake of simplicity. Typical internal heating elements are e.g. enclosed in German Pat. Nos. 33 35 280 and 28 24 971. German Pat. No. 33 35 280 describes e.g. a centrally located, electrically conducting heating rod which is surrounded by a tubular body and electrically insulated therefrom. At their free end, the heating rod and the tubular body are electrically connected together to form an electric circuit. This type of heat conductor is generally known, and thus has been omitted from the drawings for sake of simplicity. External heating elements are e.g. disclosed in German patent publication DE-OS 36 40 620.

Turning now to FIG. 3, there is shown a partly sectional view of another embodiment of a needle seal nozzle assembly according to the present invention which differs from the embodiment shown in FIG. 2 in the configuration of the slide unit 21 between the housing portions 12, 14. In contrast to the previous embodiment, the conical bottom 40 is secured to a guide bush 32 which is received in the gap S1 between the housing portions 12, 14. The guide bush 32 is formed with at least one bore 34 for receiving a bolt 36 by which the conical bottom 40 is secured to the flange 23 that forms part of the drive mechanism to move the slide unit 21 between the retracted open position and the forward closing position for regulating the flow of melt through the melt passage. The drive mechanism may be configured in the form of a hydraulic, pneumatic or mechanical drive.

Suitably, the conical bottom 40 of the slide unit 21 has a configuration that complements the forward conical bottom 13 of the housing portion 12 and/or of the heating element 28.

Figure 5:
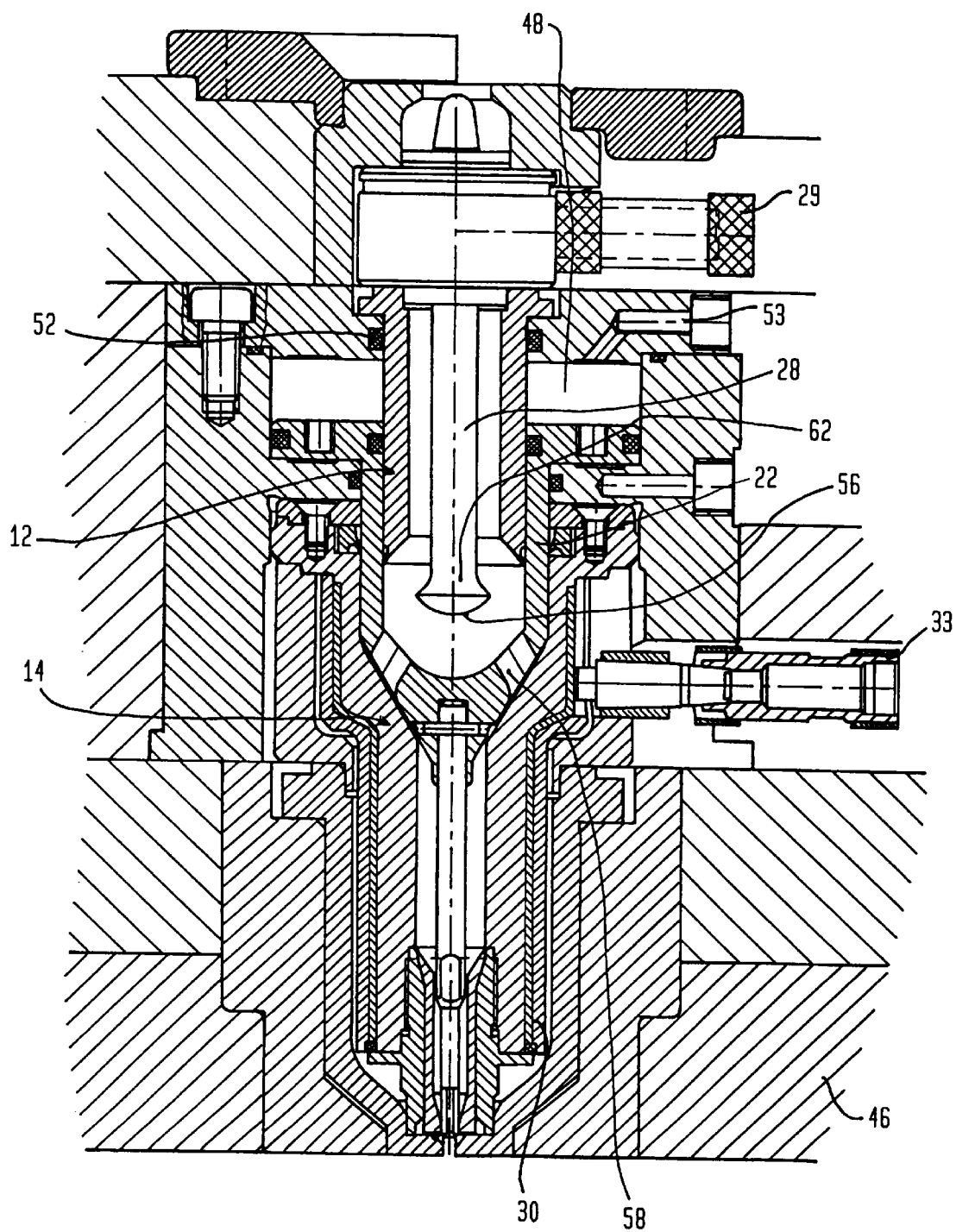
FIG. 5 is a fragmentary, sectional view of the injection molding system of FIG. 4, showing the sealing needle in forward closed position.

Referring now to FIG. 4, there is shown a fragmentary, sectional view of an injection molding system, incorporating a needle seal nozzle assembly according to the present invention. In general, a hot-runner manifold or housing 10 of this type should effect a heat conduction that generates heat in a predetermined manner for application to the melt. Neither local overheating nor heat losses nor solidification of the melt should occur. In order to eliminate sealing problems, the housing portions 12, 14 and the slide unit 21 interact in such a manner that the heat expansions will not exceed a predetermined value. Moreover, overheating in the area of the drive mechanism should be avoided, especially when using a hydraulic or pneumatic piston with sealing elements, as shown in FIGS. 4 and 5.

The housing portions 12, 14 of the hot-runner manifold 10 are retained in a mounting block 42 and in mold plates 44, 46. A cylinder 48 is formed in the mounting block 42 for receiving the flange 23 of the slide unit 21. The flange 23 thus assumes the function of a piston of a cylinder/piston drive mechanism. The flange, i.e. piston 23, is sealed against the mounting block 42 and the housing portion 12 by suitable gaskets 52, and is acted upon by pressurized fluid that is supplied from a suitable source via a supply channel 53 in the mounting block 42. Thus, the slide unit 21 can be displaced between a retracted open position, as shown in FIG. 4, in which the sealing needle 24 is withdrawn from the gate 17, and a forward closed position, as shown in FIG. 5, in which pressurized fluid urges the piston 23 and thus the slide unit 21 in forward direction to enable the sealing needle 24 to close the gate 17. The disposition of the internal heating element 28 centrally within the housing portion 12 substantially prevents heat from migrating toward the outside so that surrounding and adjacent components such as piston 23 and cylinder 48, and in particular the gaskets 52, remain relatively cool to thereby prolong their service life. The heating element 30 is suitably sandwiched between the housing portion 14 and a bushing 54 and may e.g. be formed by a heating spiral or the like.

As further shown in FIG. 4, the heating element 28 is formed by an elongated shaft which terminates at its forward free end in a cone-like enlargement 62 and a spherical end face 56 to complement the inside surface of the conical bottom 40 of the slide unit 21. This configuration of the forward end of the heating element 28 is advantageous in two respects in conjunction with the retracted sealing needle 24 to open the gate 17 for passage of melt to the mold cavity. The spherical end face 56 enables during retraction of the sealing needle 24 enhanced flow dynamics of the melt Men exiting through the feed channels 58, and moreover, the expanded surface effect a sufficient transfer of heat towards the adjoining end face 56. The cone-like enlargement 62 between the spherical end face 56 and the cylindrical shaft of the heating element 28 conducts the melt at enhanced flow dynamics through the feed channels 58 into the housing portion 14.

Figure 6:
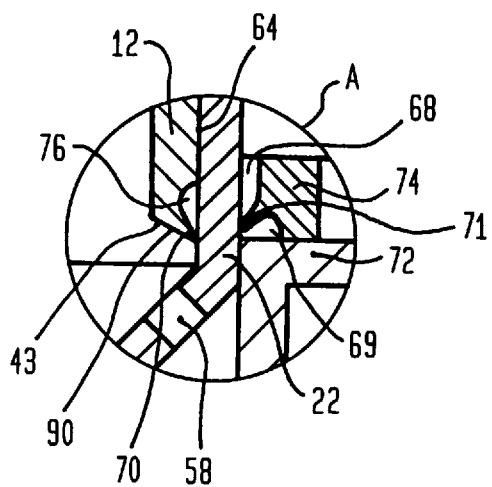
FIG. 6 is a cutaway sectional view of a detail marked "A" in FIG. 4.

Turning now to FIG. 6, there is shown a cutaway sectional view of a detail marked "A" in FIG. 4 in order to more clearly depict the sealing between the housing portions 12, 14 and the slide unit 21. As shown in FIG. 6, the housing portion 12 has an outer surface area 64 which bears upon the sleeve 22 of the slide unit 21. In immediate proximity of its forward end 43, the housing portion 12 is formed with a circumferential groove 76 so that the extreme lower end 43 forms a relatively elastic sealing lip 70. In a similar manner, the housing portion 14 is formed at its upper end 72 with a gasket 74 that is formed with a recess 68 and a recess 69 to exhibit a respective sealing lip 71 that bears upon the sleeve 22 at the side distant to the housing portion 12.

It will be appreciated by persons skilled in the art that it is certainly within the scope of the invention to provide a needle seal nozzle assembly without incorporation of seals between the movable slide unit 22 and the stationary housing portions 12, 14. This is possible because layers of melt may solidify to a certain degree in the regions adjacent to the cooler wall surface of the melt passage. These solidified layers in the area of the components that move relatively to one another form a natural sealing that may eliminate the need for separate seals. Advantageously, the forward annular end face 43 of the housing portion 12 exhibits a blade-like edge 90 in the area of its outer diameter. This blade-like cutting edge 90 is able to peel off melt that is still hot but already solidified from the wall surface of the sleeve 22 in order to return the plastic material towards the core area of the melt. In this manner, while a newly solidified and sealing portion of melt material can build up with each cycle, this portion is thus always returned to the melt flow.

The same conditions apply in the area of the gap formed between the housing portion 14 and the sleeve 22. Melt can migrate into this gap and solidify. When moving the sealing needle 24 into the forward closed position, melt is pushed back through the channels 58, with solidified layer of melt for sealing purposes remaining in the cooler area of the housing portion 14.

Figure 7:
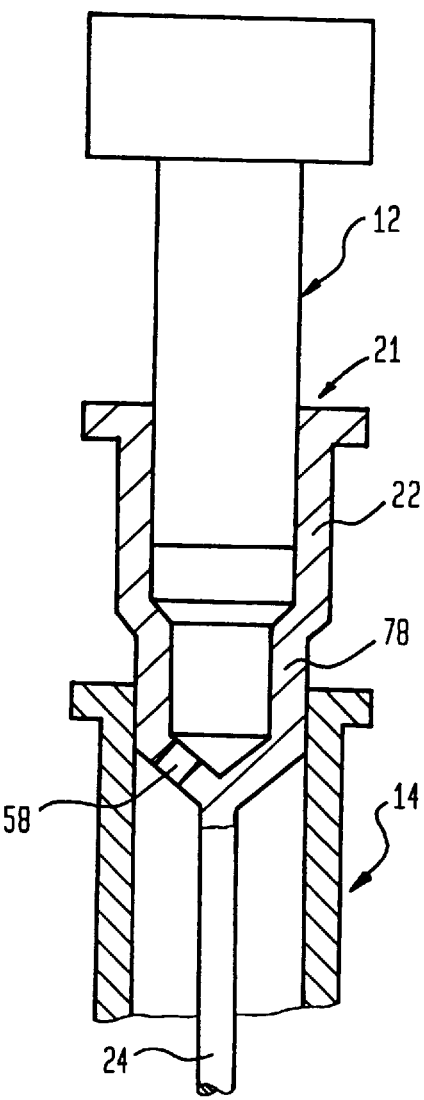
FIG. 7 is a fragmentary, partly sectional view of another embodiment of a needle seal nozzle assembly according to the present invention.

Referring now to FIG. 7 there is shown a fragmentary, partly sectional view of another embodiment of a needle seal nozzle assembly according to the present invention, which differs from the previous embodiments in the considerable reduction or effective elimination of the gap formed between the housing portions 12, 14. The sleeve 22 is formed in an area facing the sealing needle 24 with a forward section 78 which compared to the sleeve 22 is of reduced diameter. This allows also a reduction of the diameter of the housing portion 14 so that the distance between cavities in a multi-cavity mold that has several hot-runner systems 10 supplied from a common manifold can be kept small. Through appropriate reduction of the diameter of the forward section 78 and suitable configuration of the housing portion 12 results in an embodiment of the needle seal nozzle assembly without formation of a gap S1. The diameter of the sleeve 22 complements the housing portions 12, 14 to effect a seal of the sleeve 22 from the housing portions 12, 14. In all other respects, this embodiment corresponds to the previously described embodiments.

While the invention has been illustrated and described as embodied in a heatable needle seal nozzle assembly, it is not intended to be limited to the details shown since various modifications and structural changes may be made without departing in any way from the spirit of the present invention.

What is claimed as new and desired to be protected by Letters Patent is set forth in the appended claims:

1. A needle seal nozzle assembly for a plastics injection machine, injection mold or hot-runner system, said nozzle assembly comprising:

a housing defining a passageway for feeding a flowable material from an inlet to an outlet, said housing being formed by a first housing portion having a first end forming the inlet and a second end opposite said first end, and by a second housing portion facing the second end of the first housing portion and having an interior forming one part of the passageway, said first housing portion including a substantially cylindrical tubular body which defines a fluid channel forming another part of the passageway and being fluidly connected to the interior of the second housing portion;

a sealing needle for regulating the fluid flow through the outlet, said sealing needle being received in the second housing portion and having a guide member guided outside along the tubular body;

a drive mechanism acting on the guide member for actuating the sealing needle;

a first heating element so received centrally in the fluid channel of the first housing portion as to shape the fluid channel in the form of a circular ring; and a second heating element secured around the second housing portion said first heating element being so dimensioned as to extend into a sphere of influence of the second heating element.

2. The nozzle assembly of claim 1 wherein the guide member is a slide received in fluidtight manner between the first and second housing portions for displacement between a first position in which the outlet is closed and a second position in which the outlet is open.

3. The nozzle assembly of claim 2 wherein the first and second housing portions define an annular gap for receiving the slide.

4. The nozzle assembly of claim 3 wherein the drive mechanism includes a piston and cylinder arrangement, a guide bush received in the annular gap between the first and second housing portions and formed with a bore and a bolt traversing the bore and securing the piston to the slide, with the piston reciprocating within the cylinder for moving the slide between the first and second positions.

5. The nozzle assembly of claim 2 wherein the first housing portion has an outer diameter, and the second housing portion has an inner diameter, said outer diameter of the first housing portion being at least equal to the inner diameter of the second housing portion, said slide having a first section of relatively greater diameter to circumscribe the first housing portion and a second section which exhibits a relatively smaller diameter in a transition area between the first section and the sealing needle and bears upon the second housing portion.

6. The nozzle assembly of claim 2 wherein the the slide has a needle-distant end having a contour which complements a contour of at least one element selected from the group consisting of an inlet facing end of the first housing portion and an adjacent end of the heating element.

7. The nozzle assembly of claim 2 wherein the slide has an outer diameter, said second housing portion being so shaped in an area facing the first housing portion as to form a seal that bears upon the outer diameter of the slide.

8. The nozzle assembly of claim 1 wherein said housing defines a longitudinal axis, said passageway extending substantially in symmetry to the axis.

9. The nozzle assembly of claim 1 wherein the drive mechanism includes a drive selected from the group consisting of hydraulic drive, pneumatic drive and mechanical drive.

10. The nozzle assembly of claim 1 wherein the first and second housing portions overlap each other.

11. The nozzle assembly of claim 1 wherein the drive mechanism includes a piston and cylinder arrangement, with the piston being formed in one piece with the slide and reciprocating within the cylinder for moving the slide between the first and second positions.

12. The nozzle assembly of claim 1 wherein the heating element exhibits a needle-proximate end which is formed with a conical enlargement and a needle-distal end.

13. The nozzle assembly of claim 12 wherein the heating element includes a rod-shaped section extending from the needle-proximate end to the needle-distal end of the heating element, said needle-proximate end having an end face which is so dimensioned as to exceed a cross sectional area of the rod-shaped section.

14. The nozzle assembly of claim 13 wherein the end face is of spherical configuration.

15. The nozzle assembly of claim 1 wherein the inlet forming end of the first housing portion exhibits an edge in the form of a blade.

16. The nozzle assembly of claim 1 wherein the first housing portion is so formed in an area of the inlet forming end with a circumferential groove as to exhibit relatively elastic sealing lips.

* * * * *